(12) United States Patent
Li et al.

(10) Patent No.: US 10,579,071 B1
(45) Date of Patent: Mar. 3, 2020

(54) REAL-TIME FORMED ROBOTIC SWARM FOR MATERIAL HANDLING

(71) Applicant: GM GLOBAL TECHNOLOGY OPERATIONS LLC, Detroit, MI (US)

(72) Inventors: Jinglin Li, Sterling Heights, MI (US); Xiang Zhao, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/124,329

(22) Filed: Sep. 7, 2018

(51) Int. Cl.
G05D 1/02 (2006.01)
G05D 1/00 (2006.01)

(52) U.S. Cl.
CPC ......... *G05D 1/0289* (2013.01); *G05D 1/0088* (2013.01); *G05D 1/0214* (2013.01)

(58) Field of Classification Search
CPC ... G05D 1/0289; G05D 1/0214; G05D 1/0088
USPC .......................................................... 701/26
See application file for complete search history.

(56) References Cited

U.S. PATENT DOCUMENTS

| | | | | |
|---|---|---|---|---|
| 5,111,401 A | * | 5/1992 | Everett, Jr. .......... | G05D 1/0242 701/24 |
| 6,539,294 B1 | * | 3/2003 | Kageyama .............. | E02F 3/842 180/168 |
| 9,921,582 B2 | | 3/2018 | Spicer et al. | |
| 2017/0308084 A1 | * | 10/2017 | Spicer .................. | G05D 1/0295 |
| 2019/0187699 A1 | * | 6/2019 | Salour .................. | G05D 1/0289 |
| 2019/0294181 A1 | * | 9/2019 | Ohno .................... | G05D 1/0238 |

FOREIGN PATENT DOCUMENTS

JP 2018-056473 * 3/2018

* cited by examiner

*Primary Examiner* — Brian P Sweeney
(74) *Attorney, Agent, or Firm* — Reising Ethington P.C.; Bonnie Shaw (57) ABSTRACT

Example methods and systems may transport an object with a plurality of transport vehicles. An example transport vehicle may be autonomous, and may have one or more wheels extending from a body for engaging a ground surface. Example methods may include providing a destination for the object to the plurality of transport vehicles, wherein the plurality of transport vehicles determines a route to the destination, dividing the route into one or more route segments for the plurality of transport vehicles, encountering an obstacle with a first one of the transport vehicles while traveling along one of the route segments, and sending a location of the obstacle from the first transport vehicles to at least a second one of the transport vehicles. A second one of the transport vehicles may modify at least one of the route segments to avoid the obstacle based upon the provided location.

16 Claims, 7 Drawing Sheets

REAL-TIME FORMED ROBOTIC SWARM FOR MATERIAL HANDLING

INTRODUCTION

The statements in this section merely provide background information related to the present disclosure and may not constitute prior art.

An automated guided vehicle (AGV) is an unmanned and/or self-propelled vehicle that is used to transport a payload along a route without real-time human assistance.

Because an AGV operates with controlled navigation, it can eliminate the need for direct operator involvement (e.g., no human operator), thereby reducing the risks associated with operator-introduced error during movement. Movement of an AGV is typically along a guided path or route laid out in or on a facility floor, warehouse, distribution center, etc. The AGV can utilize a human controller interface (e.g., a joystick), optical sensors, magnetic sensors, electrical field sensors, a global positioning system (GPS), inertial guidance, and/or laser guidance for navigation along the desired path. The guidance system can dictate a precise and repeatable path for the AGV to follow, while the sensor systems can provide real-time updates for anything that encroaches upon the AGV's path of travel.

The fixed path of typical AGVs may result in disruptions of service when the paths are blocked, and replacement of AGV units may be difficult as a result of the specialized instructions for each in a given system. Accordingly, there is a need for an improved system and method for material handling.

SUMMARY

In at least one aspect, a method of transporting an object with a plurality of transport vehicles having one or more wheels extending from a body for engaging a ground surface includes providing a destination for the object to the plurality of transport vehicles, wherein the plurality of transport vehicles determines a route to the destination. The method may further include dividing the route into one or more route segments for the plurality of transport vehicles, encountering an obstacle with a first one of the transport vehicles while traveling along one of the route segments, and sending a location of the obstacle from the first transport vehicles to at least a second one of the transport vehicles, wherein at least a second one of the transport vehicles modifies at least one of the route segments to avoid the obstacle based upon the provided location.

In some examples, a method also includes confirming the location of the obstacle with at least the second one of the transport vehicles. In these particular examples, a method may further include designating the plurality of transport vehicles as a swarm, wherein the location of the obstacle is confirmed by all of the plurality of the transport vehicles included in the swarm.

In at least some examples, modifying the at least one of the route segments includes adjusting at least a subsequent one of the segments of the second transport vehicles, the subsequent segment following the one of the route segments in which the obstacle is encountered.

In some example illustrations, modifying the at least one of the route segments includes adjusting the one of the route segments in which the obstacle is encountered.

In another example, a method includes designating a subset of available transport vehicles as a swarm based upon at least one characteristic of the object, and at least one characteristic of an available transport vehicle. In these examples, the at least one characteristic of the object includes at least one of a weight or mass of the object, a shape of the object, and a locating position of the object, and the at least one characteristic of the available transport vehicle includes at least one of a load capacity of the transport vehicle and a size of the transport vehicle.

In some examples, each of the transport vehicles are autonomous transport vehicles (ATVs) configured to autonomously navigate to the provided destination.

In these examples, a method may further include confirming the location of the obstacle with at least the second one of the ATVs.

In some examples, a method also includes designating the plurality of the ATVs as a swarm, wherein the location of the obstacle is confirmed by all of the plurality of the ATVs included in the swarm.

In these examples, the method may include modifying the at least one of the route segments by adjusting at least a subsequent one of the segments of the second ATV, the subsequent segment following the one of the route segments in which the obstacle is encountered.

In these examples, modifying the at least one of the route segments includes adjusting the one of the route segments in which the obstacle is encountered.

In some example approaches, a method also includes designating a subset of available ATVs as a swarm based upon at least one characteristic of the object, and at least one characteristic of an available ATV.

The at least one characteristic of the object may, in some examples, include at least one of a weight or mass of the object, a shape of the object, and a locating position of the object, and the at least one characteristic of the available ATV includes at least one of a load capacity of the ATV and a size of the ATV.

In another aspect, an autonomous transport vehicle system is provided, which may include a facility level controller and a plurality of autonomous transport vehicles (ATVs). Each of the ATVs may include one or more wheels extending from a body of the ATV for engaging a ground surface, an ATV controller configured to determine a route for the ATV based upon a destination provided by the facility level controller, the route divided into a plurality of route segments for the ATV, and at least one sensor configured to detect an obstacle in one of the route segments. The controller is in communication with at least a second one of the ATVs such that the ATV is configured to send a location of the obstacle to the second ATV, wherein the second ATV modifies at least one of the route segments for the second ATV to avoid the obstacle based upon the provided location.

In some examples, the ATV includes at least one outwardly detecting sensor configured to detect the obstacle.

In at least some example illustrations, the facility level controller is configured to designate the plurality of the ATVs as a swarm, and all of the plurality of the ATVs included in the swarm include respective sensors configured to confirm the location of the obstacle.

In some examples, the second ATV is configured to modify the at least one of the route segments by adjusting at least a subsequent one of the segments of the second ATV, the subsequent segment following the one of the route segments in which the obstacle is encountered.

In some examples, the second ATV is configured to modify the at least one of the route segments by adjusting the one of the route segments in which the obstacle is encountered.

The facility level controller, in some examples, may be configured to designate a subset of available ATVs as a swarm based upon at least one characteristic of the object, and at least one characteristic of an available ATV.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Example illustrations are provided below of a material handling system and associated methods. Generally, example systems may employ multiple self-driving robotic transport vehicles that execute material handling tasks in real-time. Groups of the transport vehicles may be designated as a "swarm" by a control system based on the assigned tasks. Accordingly, different numbers and/or configurations of the swarms may be used to execute material handling tasks according to the particular task requirements.

In some examples, an Autonomous Transport Vehicle (ATV) is an unmanned and self-propelled robotic vehicle that is used to transport a payload along a route which can be pre-defined or determined in real-time by the ATV itself. The ATV may utilize a controller, optical sensors, distance sensors, a global positioning system (GPS), and/or laser guidance for navigation, merely as examples. The navigation system can dictate a precise path for the ATV to travel and provide real-time path adjustments for anything that encroaches upon the ATV's travel path.

As will be described further below, example ATVs may generally be autonomous in their navigation of a route or segment to a destination, in contrast to the defined or dedicated paths typically required in previous approaches. Moreover, a swarm of ATVs may be formed in real-time depending on requirements of a given material handling task. Merely as examples, inputs such as an object size, shape, weight, and/or locating position(s) may be used to determine a footprint of a robotic swarm of ATVs, a number of ATVs needed for the task, and/or positioning of the ATVs. An availability of one or more ATVs may also be used, e.g., by a system level controller, to determine which ATV(s) will be designated as being included in a given swarm. The autonomous ATVs may generally navigate independently in real-time, and may avoid obstacles without intervention from a system or facility-level controller.

Figure 1:
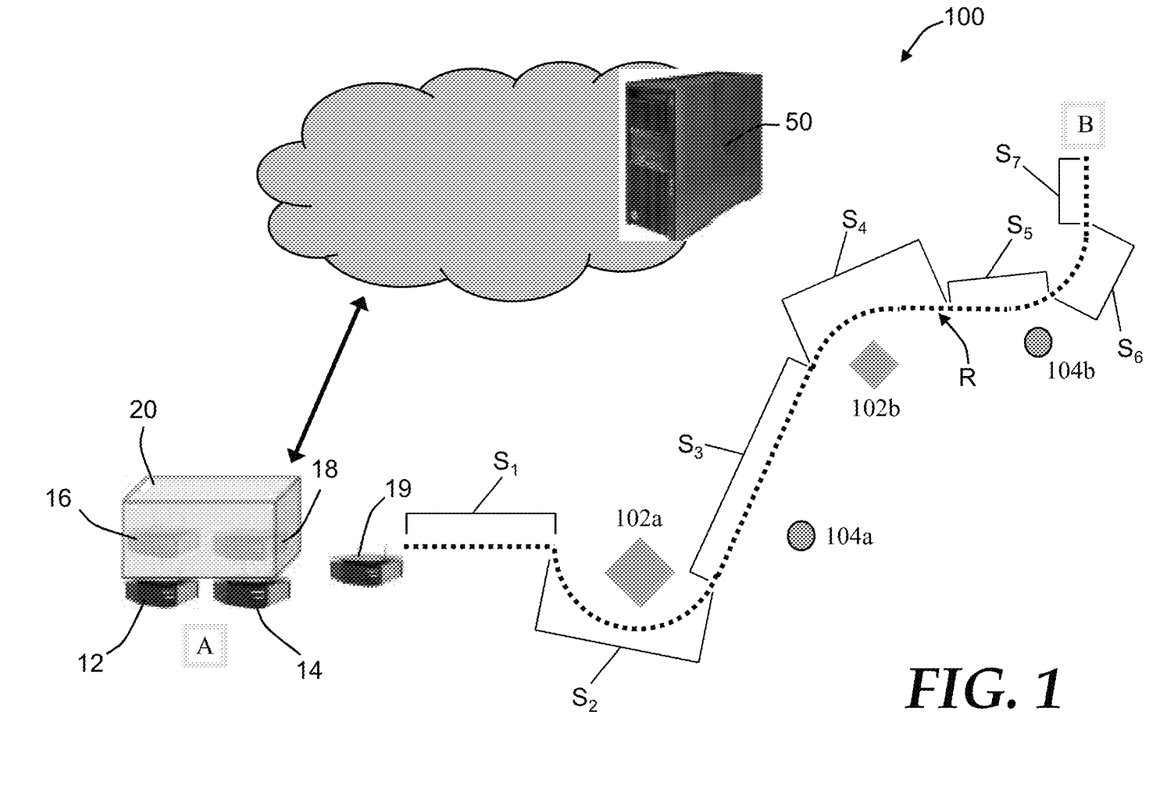
FIG. 1 is an example system for material handling including a swarm of independent or autonomous transport vehicles (ATVs) for carrying out material handling tasks.

Referring now to FIG. 1, an exemplary autonomous transport vehicle system 100 is shown. The autonomous transport vehicle system 100 includes five autonomous transport vehicles (ATVs) 12, 14, 16, 18, 19, with four of the ATVs 12, 14, 16, 18 arranged in a quadrilateral pattern for supporting a payload 20. Thus, the four ATVs 12, 14, 16, 18 may be designated as a swarm for transporting a payload 20. The fifth ATV 19, on the other hand, may not be available, or may not be needed to carry out the task of transporting the payload 20 (e.g., based upon a load carrying capacity, footprint, etc., of the other ATVs), and thus may be temporarily idle.

While described as ATVs, it should be understood that any type of self-guided and/or self-propelled vehicle can be used within the autonomous transport vehicle system 100 including, but not limited to, automated guided vehicles (AGVs), automated guided carts (AGC), laser guided vehicles (LGV), vision guided vehicles (VGV), other autonomous vehicles, or the like. In one example, the ATVs 12, 14, 16, 18 are autonomous robotic transports, where each is a mobile robot that does not need external guidance, e.g., by way of markers or wires in the floor. The ATVs 12, 14, 16, 18 may thus be self-navigated using LIDAR, RADAR, cameras or other visual navigation devices facilitating three-dimensional vision, ultrasonic sensors, or the like.

The payload 20 may be any workpiece, assembly, or even a person, as will be described further below. Thus, there is generally no limitation on what payload 20 may be carrier by the ATVs 12, 14, 16, 18. In some cases the payload 20 may be quantities of completed parts, manufacturing fixtures, or any other payload that is too large to be moved by other conventional methods or that requires precision and control in delivery. The autonomous transport vehicle system 100, as described herein, may be beneficial for use in the automotive and aerospace manufacturing industries; the pulp and metal processing industries; the agricultural, military, appliance, construction, food and beverage, consumer products and medical service industries; and general manufacturing applications, merely as examples.

The system 100 further includes a facility controller 50, which generally assigns tasks to the ATVs 12, 14, 16, 18, and 19 as needed. Thus, the controller 50 may analyze tasks, designate one or more ATVs as being included in a swarm for carrying out a given task, and may also generate one or more routes R for ATV(s) in a swarm. The controller 50 may thus be in communication with each of the ATVs 12, 14, 16, 18, and 19, as will be described further below. The route R may, in turn, be divided into a plurality of segments S, which collectively make up the route R. Any number of segments S may be employed. As will be discussed further below, the route R may be divided into a first segment $S_1$, a second segment $S_2$, etc., with a total number of segments E such that the final segment is designated segment $S_E$. In the example illustrated in FIG. 1, the route R is divided into seven (7) segments, i.e., $S_1$, $S_2$, $S_3$, $S_4$, $S_5$, $S_6$, and $S_7$. Any number of segments in a route may be employed that is convenient.

The system 100 may facilitate handling of materials, e.g., payload 20, from an initial location A to a location B, which may be a destination or delivery location for the payload 20. One or more landmarks 104a, 104b (collectively, 104) may have a known position. The landmarks 104 may be fixed in position in the system 100, or may be otherwise known locations that provide references to the controller 50 and/or the ATVs 12, 14, 16, 18, and 19. One or more obstacles 102a, 102b (collectively, 102) may also be present in the system 100. The obstacles 102 may be fixed objects, moving vehicles in the system 100, pedestrians, etc. Generally, the controller 50 facilitates completion of tasks or subtasks associated with delivering payloads to a desired destination, e.g., location B. The ATVs 12, 14, 16, and 18 may generally seek to avoid obstacles 102, which may or may not be initially known to the controller 50 or ATVs, or at least when a material handling task(s) is given to one or more of the ATVs in a particular swarm.

Generally the controller 50 may be a facility or plant-level controller having responsibility for a facility or area within the facility, which facilitates development and assignment of material handling tasks. In one example, a task may be identified or required. The controller 50 may then, in real time, determine a number of ATVs needed for the task. For example, the controller 50 may, based upon a footprint of each of the ATVs, or a load capacity, or the like, determine a number of ATVs needed for the task. Similar parameters of the payload 20, e.g., weight, dimensions, locating positions, etc., may be used in designating a swarm of ATVs. The controller 50 may also select one or more of the ATVs that are available for the task, and may also assign one "lead" ATV for the swarm. Merely by way of example, ATV 12 may be designated as the lead ATV in the example in FIG. 1.

The controller 50 may also form the swarm's overall shape to handle the task, e.g., by designating a layout of ATVs 12, 14, 16, and 18 relative to each other. In the example illustrated in FIG. 1, a rectangular orientation of the ATVs 12, 14, 16, 18 is employed. However, this arrangement is merely one example, and any arrangement may be employed that is convenient. The controller 50 may also determine a path or route from location A to location B, and transmit the determined route to the lead ATV 12. The lead ATV 12, in turn, may communicate with other ATV(s) 14, 16, and 18 in the swarm to synchronize their movement, and change the route in real time if necessary, e.g., when an obstacle is detected, as will be discussed further below.

Figure 2A:
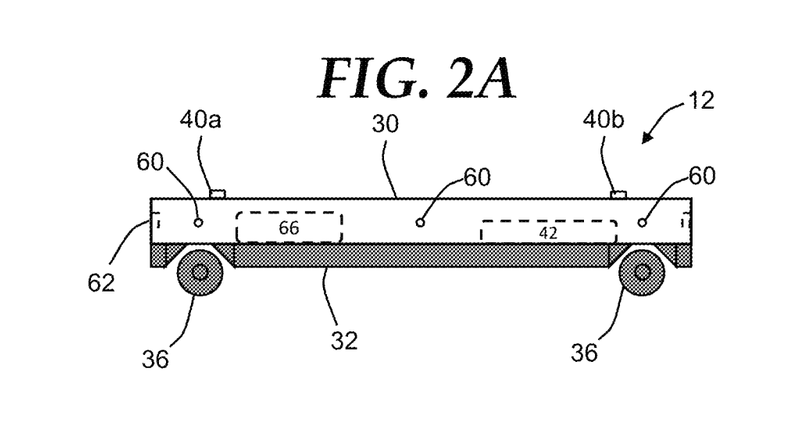
FIG. 2A is a side view of an example ATV for the system of FIG. 1.
Figure 2B:
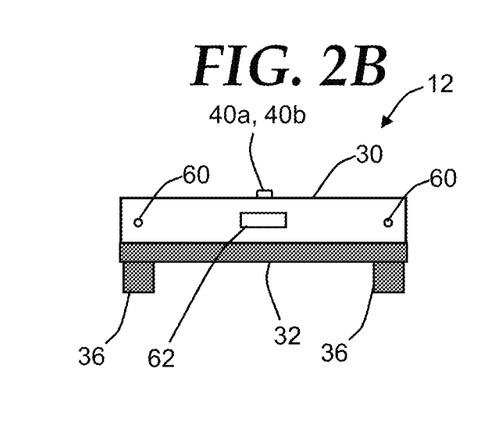
FIG. 2B is a front view of the example ATV of FIG. 2A.
Figure 2C:
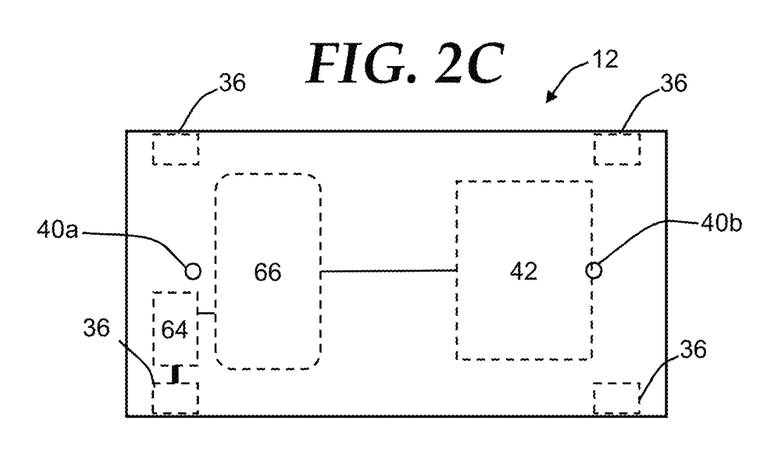
FIG. 2C is a top view of the example ATV of FIGS. 2A and 2B.

As each of the ATVs 12, 14, 16, 18, and 19 may be similar or even identical in design, only ATV 12 will be described in detail herein. Referring now to FIG. 2, ATV 12 includes a body having a lower portion 32 and an opposing upper portion 30. The lower portion 32 of the ATV 12 includes four wheels 36 extending therefrom for engaging a ground surface (e.g., a plant or facility floor). The wheels 36 may be any size, shape, or configuration that is convenient, and may in some examples be omnidirectional in order to provide forward and reverse motion, crabbing, and rotational movement capabilities with respect to a ground surface in order to assist in maneuvering techniques used by the autonomous transport vehicle system 100 (e.g., maintaining formation). Alternatively, one or more, or even all, of the wheels 36 may be standard wheels or casters, crawler tracks, or a conveyor system.

The upper portion 30 of the ATV 12 may include at least one locator, such as pins 40a and 40b (collectively, 40) extending a predetermined distance above a top surface of the ATV 12. Each locator 40 arranged on the ATV 12 may engage with a payload 20 (not shown in FIG. 2) at a predetermined datum location relative to the upper body portion 30 and/or lower body portion 32 of the ATV 12. For example, the locator pins 40 may extend into a locator hole (not shown) on a surface of the payload 20 such that positioning of the payload 20 may be maintained during assembly and/or manufacturing operations. The locator pin 40 may be fixedly secured to the top surface of the ATV 12 or may be movably arranged thereon. Moreover, the locator pin 40 may interface with an intermediate fixture(s) as needed for handling a payload 20, examples of which will be discussed further below. A robot material handler (not shown) may place parts upon a formed swarm of ATVs. For example, a payload 20 may be placed upon a standardized fixture (not shown), or the ATVs themselves may have an end effector or other movable fixture(s) for carrying parts or a payload 20.

The ATV 12 may also house an on-board controller 42 for controlling movement of the ATV 12. On-board controller 42 may employ distributed robotics technologies, i.e., which provide the ability for the on-board controller 42 to behave as a master controller communicating with slave controllers arranged on the other ATVs 14, 16, 18 and also as a master controller communicating with other master controllers from alternate autonomous transport vehicle systems moving through the manufacturing facility.

Communication with alternate autonomous transport vehicle systems allows each of the ATVs to modify their route based on priorities when an obstacle is present on a normal route. Notably, all on-board controllers 42 on the ATVs 12, 14, 16, 18 may have the same computing capability, but only one of the four is assigned as the master controller in the system at any particular time. While a distributed robotics technology is described in detail herein, it should be understood that a centralized system may also be used for controlling movement of the ATVs 12, 14, 16, 18. In the centralized system, all ATVs communicate with a central controller, e.g., controller 50, which in turn may determine traffic, conflict, malfunctions, etc. and relays appropriate control maneuvers to each ATV.

The ATV 12 may also have one or more outwardly directed sensors configured to assist with navigation of the ATV 12. Merely as examples, the ATV 12 may have a plurality of distance sensors 60 at the front, side, and/or rear of the ATV 12, respectively. One or more cameras 62 or optical sensors may also be provided. The ATV 12 may be powered by any mechanism that is convenient. Merely as one example, the ATV 12 may have an electric motor 64 configured to drive one or more of the wheels 36, with the motor 64 receiving power from a battery pack 66.

On-board controller 42 of the ATV 12, acting as the master controller, communicates with the slave controllers of the ATVs 14, 16, 18 to maintain position control of each of the ATVs 12, 14, 16, 18 in both a lateral and a longitudinal direction. The master controller is responsible for direction control (i.e., where each ATV is going) and speed control (i.e., how fast each ATV is moving). The position control allows each of the ATVs 12, 14, 16, 18 to move in unison for synchronous movement of the autonomous transport vehicle system 100. In other words, the ATVs 12, 14, 16, 18 cooperate to move in a formation (e.g., swarm, platoon, or other grouping) in order to provide the capability for highly efficient, fault tolerant operations. The ability to swarm or platoon the ATVs 12, 14, 16, 18 provides quick and easy reconfiguring of the autonomous transport vehicle system 100 in order to carry alternately-sized payloads or payloads with differently arranged datums without needing to purchase new hardware. The changes to the design of the formation are accomplished quickly through programming of the master on-board controller 42.

In contrast to the responsibilities of the master controller, the slave controllers may be responsible for health-related tasks (e.g., equipment mechanical issues, state of charge, obstruction detection). As such, the slave controller can provide feedback information to the master controller 42 regarding system status, such as, but not limited to a system health status, a position and speed measurement, a position of a detected obstacle, and/or an obstacle avoidance path. In response to this information, the master controller can halt the ATVs 12, 14, 16, 18 or sound/flash an alarm when the feedback information from the slave controllers indicates a health status failure. When the master controller experiences a failure, it can reassign its master status to one of the slave controllers. It is also possible for one of the slave controllers to override the master controller to halt the system, if required. Emergency stop (e-stop) functions are activated by all ATVs, such that a safety stop can override all other commands. Each of these features is accomplished through real-time communication between the master and slaves, which may be achieved by wireless transmissions systems, like radio frequency or infrared.

The on-board controller 42 of the ATV 12 may employ generally high-resolution navigation software, and thus generally does not require pre-defined moving paths or routes. Moreover, the ATVs are each able to change their route(s) in real time, e.g., if an obstacle 102 is encountered. In other words, the ATVs 12, 14, 16, 18 may generally avoid or bypass obstacles 102 and keep moving.

In one example, the lead ATV 12 may process sensor and signal data collected by the swarm of ATVs 12, 14, 16, 18. Accordingly, the processors 42 of each of the ATVs 14, 16, 18 may collect and transmit signals or data collected from outward sensors of the ATVs 14, 16, 18 to the lead ATV 12. The lead ATV, in turn, may generally process the received information, e.g., to determine a new route or segment for any of the ATVs 12, 14, 16, and/or 18. The lead ATV 12 may also generally decide the movement of the swarm overall, and may calculate movement of individual components or subcomponents of the swarm, e.g., individual ATVs 14, 16, and 18. The ATV 12 may subsequently transmit movement signals to all the ATVs 14, 16, and 18 of the swarm. In one example, a lead ATV 12 receives information from one or more of the other ATVs 14, 16, 18 when one of those ATVs detects an obstacle necessitating a change in the path of the swarm. Accordingly, the detecting ATV may initiate a stop of motion of the other ATVs, and provide information to the other ATVs such as a position of the detected obstacle, size of the obstacle, or any other information useful in navigating the swarm of ATVs 12, 14, 16, 18 around the obstacles.

Figure 3A:
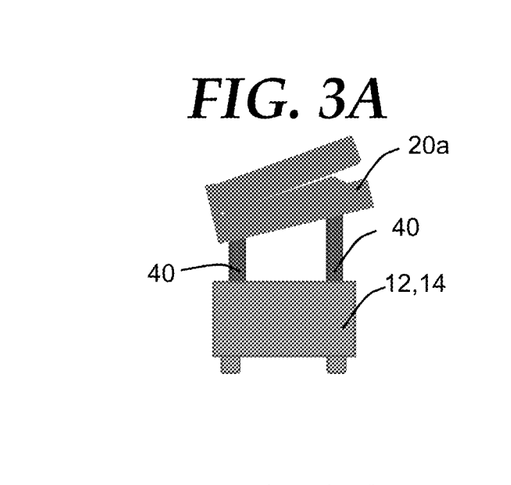
FIG. 3A is a front view of an example ATV swarm and associated handling fixture for use with ATVs such as that illustrated in FIGS. 2A-2C.
Figure 3B:
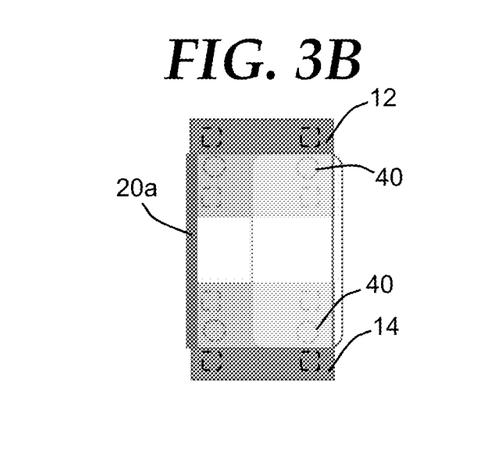
FIG. 3B is a top view of the example ATV swarm of FIG. 3A.
Figure 3C:
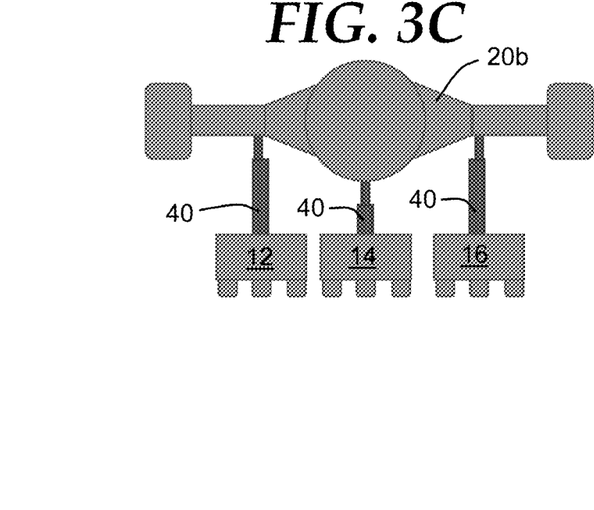
FIG. 3C is a front view of another example ATV swarm and associated handling fixture for use with ATVs such as that illustrated in FIGS. 2A-2C.
Figure 3D:
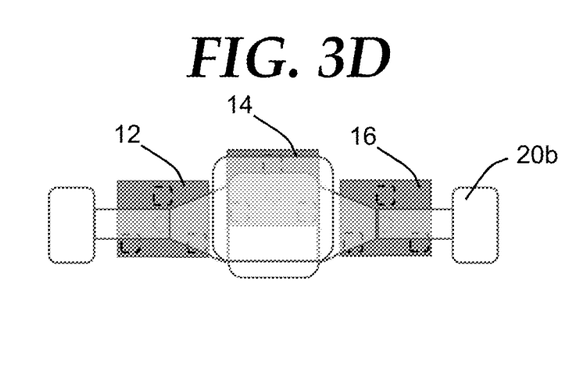
FIG. 3D is a top view of the example ATV swarm of FIG. 3C.
Figure 3E:
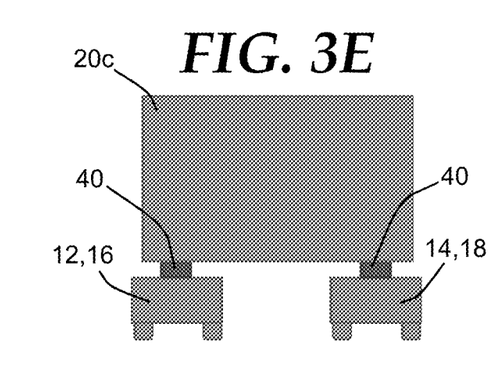
FIG. 3E is a front view of another example ATV swarm and associated handling fixture for use with ATVs such as that illustrated in FIGS. 2A-2C.
Figure 3F:
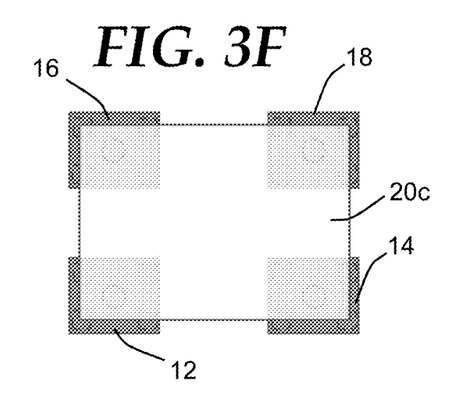
FIG. 3F is a top view of the example ATV swarm of FIG. 3E.
Figure 3G:
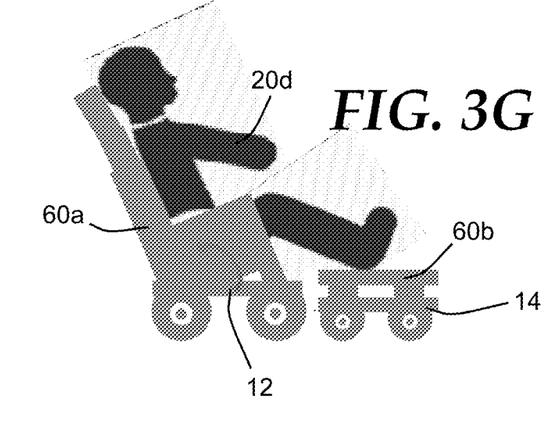
FIG. 3G is another example ATV swarm and associated handling fixture for use with with ATVs such as that illustrated in FIGS. 2A-2C.

Turning now to FIGS. 3A-3G, examples of payloads 20 that may be transported using system 100, and in particular with one or more ATVs in a swarm, are illustrated. In FIGS. 3A and 3B, an example payload 20a is a relatively large rectangular part, which is carried by two ATVs 12, 14 in a side-by-side configuration. The supports 40 of the ATVs 12, 14, may generally cooperate to engage the part 20a, thereby supporting the part 20a collectively on the swarm provided by the ATVs 12, 14. In similar fashion, another payload 20b illustrated in FIGS. 3C and 3D is a vehicle axle assembly. Three ATVs 12, 14, 16 are illustrated carrying the payload 20b using the locator pins 40, with the locator pins 40 extended to varying heights as needed to appropriately support the payload 20b. Another payload 20c that may be carried by a swarm of the ATVs is illustrated in FIGS. 3E and 3F. In this particular example, the payload 20c is a relatively larger object, e.g., a pallet of parts, which is carried by four ATVs 12, 14, 16, 18. The locator pins 40 of the ATVs 12, 14, 16, and 18 may each support the payload 20c. Another example payload 20d is illustrated in FIG. 3G. In this example, the payload 20d is a human being, e.g., a hospital patient. Two ATVs 12, 14 are employed in this example, with each having a relatively specialized fixture 60a, 60b, respectively. More specifically, the fixture 60a functions as a chair or seat for the patient 20d, while the fixture 60b provides a footrest. The foregoing examples of a payload 20 are provided merely as illustrations, and any other types of payloads may be carried by one or more ATVs or a swarm of ATVs that are convenient.

Figure 4:
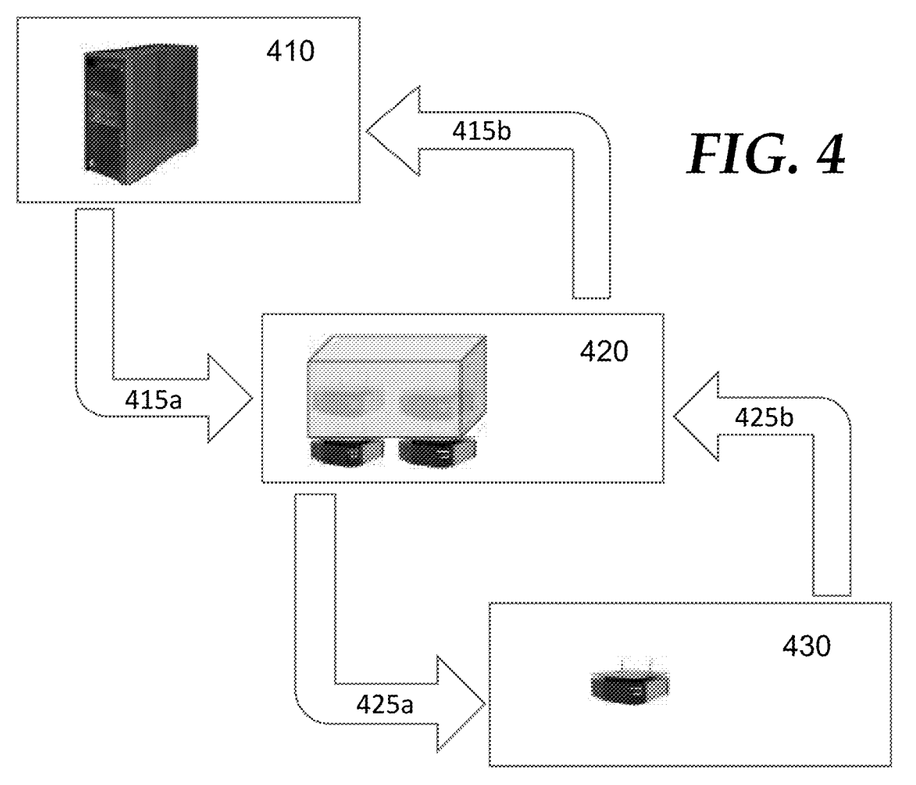
FIG. 4 is a schematic illustration of a system control for the system of FIG. 1, according to one example approach.

Turning now to FIG. 4, a schematic representation of a system control, e.g., for use in system 100, is illustrated. A facility level 410 of control may be implemented by the controller 50, which may include analysis of tasks, identification of a swarm of ATVs, and verification of task completion. A swarm level 420 of control may be implemented, e.g., by a master or lead ATV 12, to develop real-time route planning and avoid obstacles. Thus, a processor 42 of the lead ATV 12 may provide for synchronized motion control of a swarm of ATVs, and may generally calibrate and coordinate movement of other ATVs 14, 16, 18 in the swarm. At a unit level 430 of control, each individual ATV 12, 14, 16, 18 may utilize location information with respect to the ATV and/or detected obstacles to independently control its motion using autonomous guidance. Each of the individual ATVs may also collect sensor information, e.g., to detect obstacles 102, and provide location information of the ATV and/or obstacles 102 to other ATVs.

In the example control 400 illustrated in FIG. 4, the facility level control 410 may provide swarm formation instructions 415a to the swarm level 420, while the swarm level control 420 may provide inputs in the form of swarm location and task feedback 415b to the facility level control 410. The swarm level control 420 may also provide coordinated motion instructions 425a to the unit level control 430, e.g., to facilitate movement of the individual ATVs 14, 16, 18 by the lead ATV 12. The unit level control 430, in turn, may provide information regarding location(s) of the various ATVs 14, 16, 18 and/or obstacles 102 detected by the ATVs 14, 16, 18 to the lead ATV 12.

Figure 5:
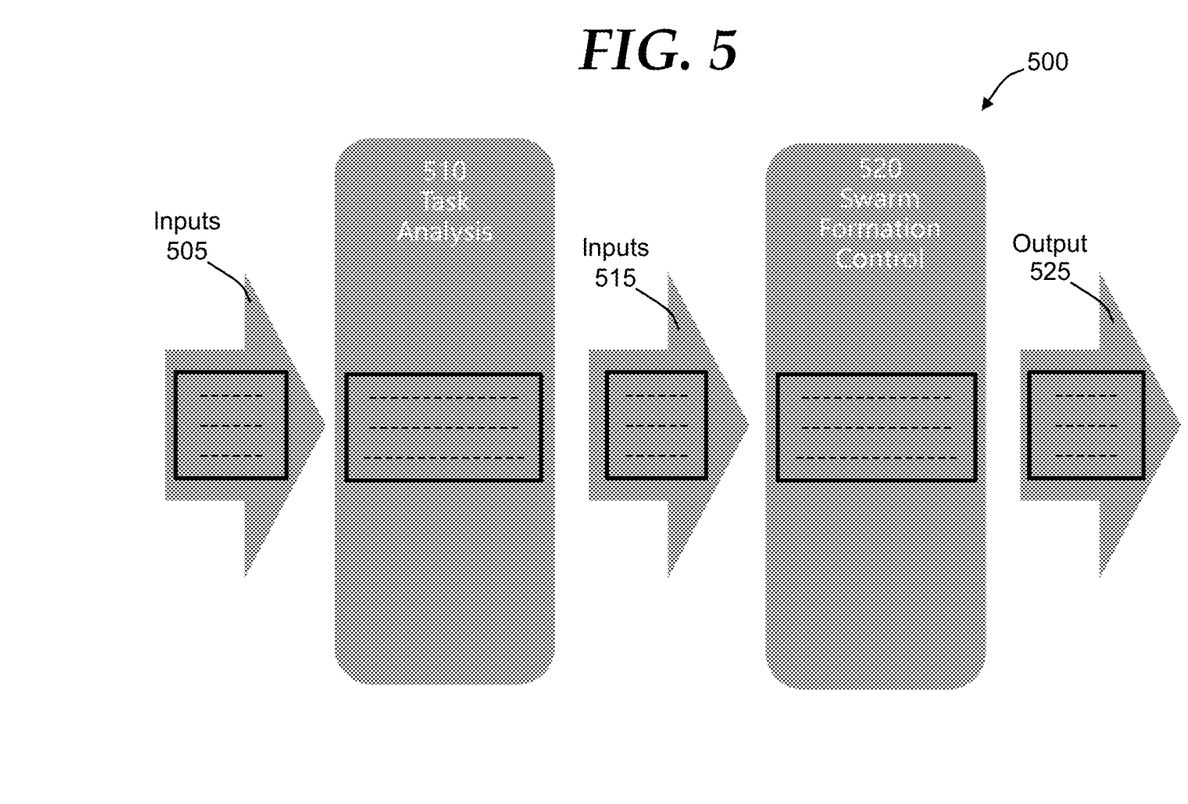
FIG. 5 is a schematic illustration of a task analysis and swarm formation control for the system of FIG. 1, according to an example.

Turning now to FIG. 5, an example process 500 for forming a swarm of ATVs is illustrated. A task analysis 510 may receive inputs 505, which includes information such as that regarding shapes, dimensions, weight, mass distribution, and clamping location(s) of an object to be moved as inputs for analyzing tasks for moving the object(s). The task analysis 510 may thus include analyzing the particular payload 20, a clamping configuration that may be employed for the payload 20, an analysis of sensor coverage associated with the ATVs available, and a stability analysis (e.g., to determine positioning and number of ATVs needed.

The task analysis 510 may provide analysis or information to swarm formation 520 based upon the inputs 505 received. Merely as examples, a number of ATVs needed, type(s) of ATVs needed, and a desired shape of a swarm of ATVs may be provided as inputs 515 to the swarm formation control 520.

Proceeding to block 520, the swarm formation control 500 may query whether/which ATVs are available for completing a given task, determine assignment of a lead ATV amongst the identified ATVs, and determine a shape of a swarm of ATVs. The swarm formation control 520 may, therefore, provide an output 525, which may include instructions regarding a determined formation for a swarm of ATVs, e.g., to the individual ATVs.

Figure 6:
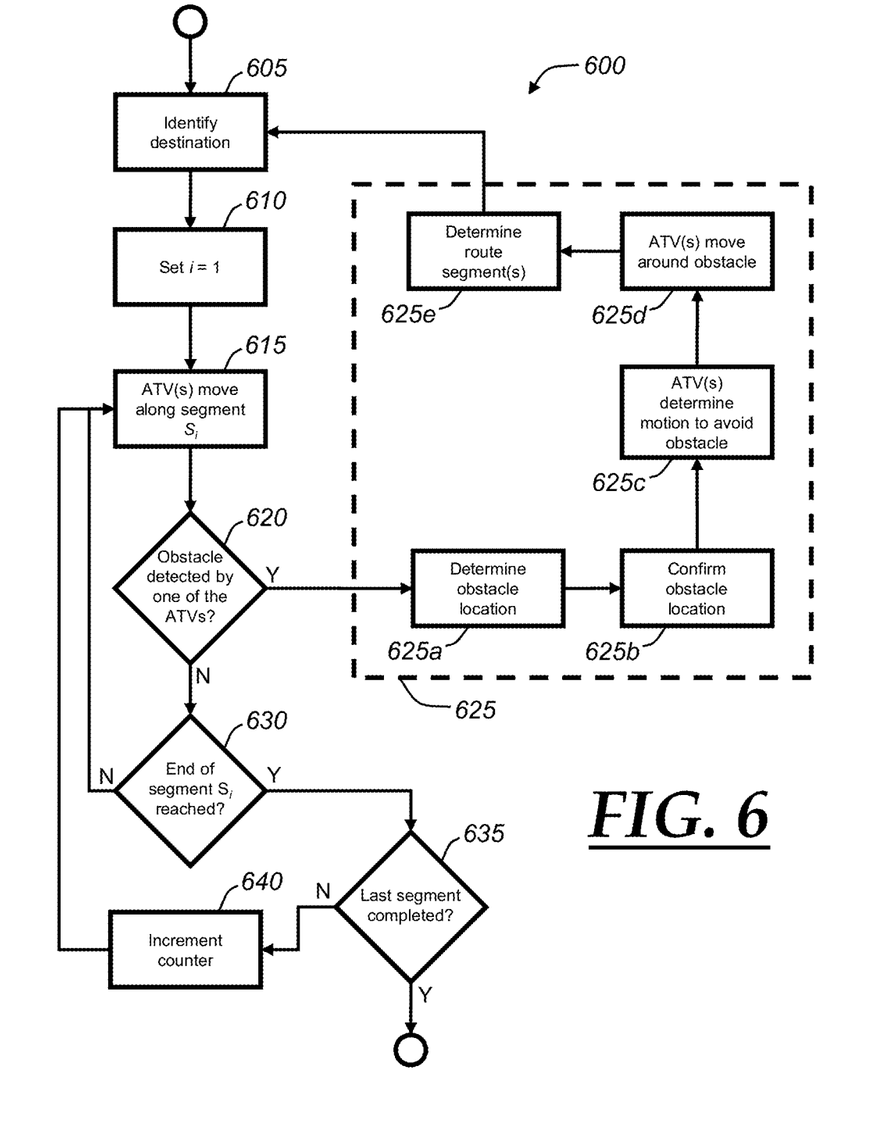
FIG. 6 is a process flow diagram, illustrating methods for handling materials using the system of FIG. 1, according to an example.

Turning now to FIG. 6, an example process 600 of handling materials is illustrated. As discussed above, in some examples the process 600 may be used to transport object(s) with a plurality of autonomous transport vehicles (ATVs) having wheel(s) configured to engage a ground surface.

Process 600 may begin at block 605, where a destination for an object is identified, and a route to the destination is segmented. Any number of segments S may be designated in the route R, which may be designated $S_1$, $S_2$, $S_3$, etc., to a maximum number of segments $S_E$. At block 605, the controller 50 may designate a route R for moving payload 20 via the ATVs 12, 14, 16, and 18 from location A to a destination, e.g., location B. In some examples, ATVs 12, 14, 16, 18 may have responsibility for navigating to a destination, e.g., where one of the ATVs 12 is designated as a lead ATV. Process 600 may then proceed to block 610.

At block 610, process 600 sets an incremental counter "i" to an initial value of one (1). This counter may be used to cycle through the various segments $S_1$, $S_2$, $S_3$, etc. of the route R, as will be discussed below in more detail.

Proceeding to block 615, each of the ATV 12, 14, 16, and 18 may move along segment $S_1$. Accordingly, with the counter (i) initially set to one (1), the ATVs 12, 14, 16, and 18 each move along the first segment $S_1$. Process 600 may then proceed to block 620.

At block 620, process 600 may query whether an obstacle has been detected by one of the ATVs 12, 14, 16, or 18. If none of the ATVs in the swarm has encountered an obstacle, process 600 may proceed to block 630.

If, on the other hand, an obstacle has been encountered, e.g., obstacle 102a, process 600 may proceed to block 625. Block 625 may generally facilitate avoidance of a detected obstacle by one or more of the ATVs in a swarm. For example, block 625 may include a number of component steps or substeps, examples of which are provided below and in FIG. 6.

Initially, process 600 may proceed to block 625a, where locations of obstacles detected by any of the ATVs are determined. Thus, an obstacle 102a may be detected by a first one of the ATVs 14. Merely by way of example, ATV 14 may detect the obstacle 102a by way of the camera 62, or one or more of the position sensors 60.

Proceeding to block 625b, a location of obstacle(s) may be validated or confirmed with another ATV in the swarm. Continuing with the example above, another of the ATVs 16 may locate the same obstacle 102a that was detected by ATV 14. In some examples, all of the ATVs 12, 14, 16, and 18 may independently confirm the location of the obstacle 102a, e.g., using externally-facing sensors of each such as camera 62, sensor 60, or the like. In some examples, a location of an obstacle 102a may be shared between the ATVs in a swarm. Merely as an example, the detecting ATV 14 may provide information regarding a location of the obstacle 102a to other ATVs in the swarm, e.g., to the lead ATV 12.

Process 600 may then modify routes or segments of routes of the ATVs. Segment modification may occur in any manner that is convenient. In one example approach, process 600 proceeds to block 625c, where each of the ATVs individually determines motion for avoiding the obstacle 102a based upon the location provided by the detecting ATV 14. Proceeding to block 625d, therefore, each of the ATVs may move around the obstacle 102a. Subsequently, at block 625e, route segments may be determined for the swarm of ATVs. In one example, the lead ATV 12 may determine a route R from the new position after the avoidance of the obstacle 102a by the swarm of ATVs, and new segments ($S_1$, $S_2$, $S_3$ ... $S_E$). In another example, a subset of the originally determined segments may need to be modified, i.e., such that a subsequent segment $S_2$ is modified based upon the new position of the swarm after obstacle detection, but the same remaining segment(s) ($S_3$, $S_4$ ... $S_E$) may be used. In some examples, the lead ATV 12 may modify segments for one or more of the ATVs 12, 14, 16, and 18 based upon the location provided by the detecting ATV 14.

Upon avoidance of the obstacle, process 600 may the proceed back to block 605. Remaining segments of the route R may subsequently be navigated by the swarm of ATVs.

At block 630, where no obstacle is detected in a given segment ($S_i$), process 600 may query whether the end of the segment ($S_i$) has been reached. Where the end of the segment has been reached, process 600 proceeds to block 635. If the end of the segment ($S_i$) has not been reached, on the other hand, process 600 may proceed to block 615, where the ATVs 12, 14, 16, and 18 in the swarm are each moved incrementally again along the segment ($S_i$).

At block 635, after completion of the current route segment ($S_i$), process 600 may query whether the last segment has been completed. In the example illustrated in FIG. 6, block 635 queries whether the current value of the counter (i) is equal to the number of segments (E). If the counter (i) is not equal to the number of segments (E), process 600 proceeds to block 640, where the counter is incremented by one (1). Process 600 then may proceed to block 615, where movement of the ATVs 12, 14, 16, and 18, as well as continued obstacle detection, may proceed. Upon completion of all of the designated segments, the value of the counter (i) is determined to be equivalent to the number of segments (E), and the payload 20 is therefore at the destination, e.g., location B. Process 600 may then terminate.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items.

Other terms are to be construed using their broadest reasonable meaning unless they are used in a context that requires a different interpretation.

What is claimed is:

1. A method of transporting an object with a plurality of transport vehicles having one or more wheels extending from a body for engaging a ground surface, the method comprising:
designating the plurality of transport vehicles as a swarm using a first electronic controller;
providing a destination for the object to the plurality of transport vehicles from the first electronic controller, wherein the plurality of transport vehicles determines a route to the destination;
dividing the route into one or more route segments for the plurality of transport vehicles using one or more transport vehicle controllers;
encountering an obstacle with a first one of the transport vehicles while traveling along one of the route segments; and
sending a location of the obstacle from a first one of the transport vehicle controllers, the first one of the transport vehicle controllers associated with the first one of the transport vehicles to at least a second one of the transport vehicle controllers, the second one of the transport vehicle controllers associated with a second one of the transport vehicles, wherein the location of the obstacle is confirmed by all of the plurality of the transport vehicles included in the swarm, and wherein at least the second one of the transport vehicles modifies at least one of the route segments to avoid the obstacle based upon the provided location.

2. The method of claim 1, wherein modifying the at least one of the route segments includes adjusting at least a subsequent one of the segments of the second transport vehicles, the subsequent segment following the one of the route segments in which the obstacle is encountered.

3. The method of claim 1, wherein modifying the at least one of the route segments includes adjusting the one of the route segments in which the obstacle is encountered.

4. The method of claim 1, wherein each of the transport vehicles are autonomous transport vehicles (ATVs) configured to autonomously navigate to the provided destination.

5. The method of claim 4, wherein modifying the at least one of the route segments includes adjusting at least a subsequent one of the segments of the second ATV, the subsequent segment following the one of the route segments in which the obstacle is encountered.

6. The method of claim 4, wherein modifying the at least one of the route segments includes adjusting the one of the route segments in which the obstacle is encountered.

7. The method of claim 4, wherein the subset of available ATVs is designated as the swarm based upon at least one characteristic of the object, and at least one characteristic of an available ATV.

8. The method of claim 7, wherein the at least one characteristic of the object includes at least one of a weight of the object, a mass of the object, a shape of the object, and a locating position of the object, and the at least one characteristic of the available ATV includes at least one of a load capacity of the ATV and a size of the ATV.

9. The method of claim 1, wherein the first electronic controller is a facility level controller.

10. A method of transporting an object with a plurality of transport vehicles having one or more wheels extending from a body for engaging a ground surface, the method comprising:
providing a destination for the object to the plurality of transport vehicles from a first electronic controller, wherein the plurality of transport vehicles determines a route to the destination;
dividing the route into one or more route segments for the plurality of transport vehicles using one or more transport vehicle controllers;
encountering an obstacle with a first one of the transport vehicles while traveling along one of the route segments; and
sending a location of the obstacle from a first one of the transport vehicle controllers, the first one of the transport vehicle controllers associated with the first one of the transport vehicles to at least a second one of the transport vehicle controllers, the second one of the transport vehicle controllers associated with a second one of the transport vehicles, wherein at least the second one of the transport vehicles modifies at least one of the route segments to avoid the obstacle based upon the provided location; and
designating a subset of available transport vehicles as a swarm based upon at least one characteristic of the object, and at least one characteristic of an available transport vehicle, using the first electronic controller.

11. The method of claim 10, wherein the at least one characteristic of the object includes at least one of a weight of the object, a mass of the object, a shape of the object, and a locating position of the object, and the at least one characteristic of the available transport vehicle includes at least one of a load capacity of the transport vehicle and a size of the transport vehicle.

12. The method of claim 10, wherein the first electronic controller is a facility level controller.

13. An autonomous transport vehicle system, comprising:
a facility level controller; and
a plurality of autonomous transport vehicles (ATVs), each of the ATVs including:
one or more wheels extending from a body of the ATV for engaging a ground surface;
an ATV controller configured to determine a route for the ATV based upon a destination provided by the facility level controller, the route divided into a plurality of route segments for the ATV; and
at least one outwardly detecting sensor configured to detect an obstacle in one of the route segments;
wherein the ATV controller is in communication with at least a second one of the ATVs such that the ATV is configured to send a location of the obstacle to the second ATV, wherein the second ATV modifies at least one of the route segments for the second ATV to avoid the obstacle based upon the provided location; and
wherein the facility level controller is configured to designate the plurality of the ATVs as a swarm, the sensors of all of the plurality of the ATVs included in the swarm being configured to confirm the location of the obstacle.

14. The autonomous transport vehicle system of claim 13, wherein the second ATV is configured to modify the at least one of the route segments by adjusting at least a subsequent one of the segments of the second ATV, the subsequent segment following the one of the route segments in which the obstacle is encountered.

15. The autonomous transport vehicle system of claim 13, wherein the second ATV is configured to modify the at least one of the route segments by adjusting the one of the route segments in which the obstacle is encountered.

16. The autonomous transport vehicle system of claim 13, wherein the facility level controller is configured to designate the subset of available ATVs as the swarm based upon at least one characteristic of the object, and at least one characteristic of an available ATV.

\* \* \* \* \*